Patented July 6, 1954

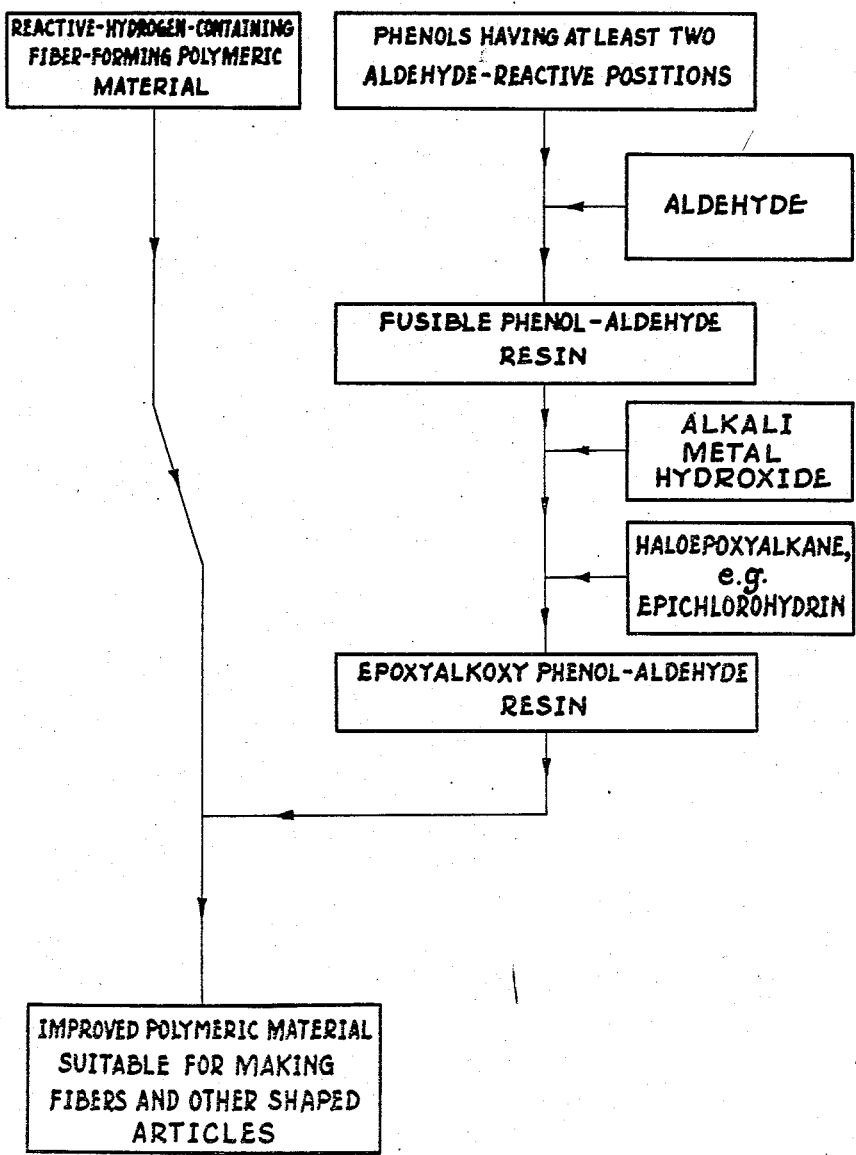

2,683,130

UNITED STATES PATENT OFFICE 2,683,130

POLYMERIC COMPOSITIONS FROM PHENOL-ALDEHYDE-EPOXY RESINS AND RESINS REACTIVE THEREWITH

Gaetano F. D'Alelio, Pittsburgh, Pa., assignor to Koppers Company, Inc., a corporation of Delaware Application May 27, 1950, Serial No. 164,841

15 Claims. (Cl. 260—43)

This invention relates to new polymeric products. More specifically it relates to fibers, bristles, monofilaments, etc., hereinafter referred to as fibers, and other shaped articles, such as films, sheets, tapes, and molded articles, made from products of the reaction of (1) fiber-forming polymers containing reactive hydrogen therein with (2) phenolic-aldehyde epoxy alkyl ether resins, the latter being referred to hereinafter as epoxyalkoxy aryl resins. These epoxyalkoxy aryl resins are disclosed and claimed in applicant's copending patent applications, Serial Nos. 164,840, 164,842 and 164,843, filed the same date as the present application of which application Serial No. 164,842 is now abandoned.

For many purposes, it is desirable that a normally resinous fiber-forming material be capable of conversion, preferably in a short time and under relatively mild or easily effected conditions, to a more heat-resistant and solvent-resistant condition and advantageously to a product of greater strength characteristics. This is especially true in the production of fibers and other shaped articles.

It has now been found that reactive hydrogen-containing resinous compositions which are suitable for preparing fibers and other shaped articles can be improved in various properties by reaction with polymeric materials represented at least in part by the formula

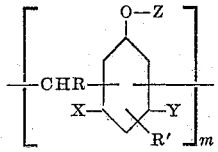

wherein
R is a substituent of the class consisting of hydrogen, and alkyl, alkenyl, aryl, aralkyl, alkaryl, cycloalkyl and furyl groups;
X and Y are substituents selected from the class consisting of hydrogen, chlorine, and alkyl and hydroxy groups;
R' is a substituent of the class consisting of hydrogen, chlorine and hydrocarbon groups such as alkyl, aryl, aralkyl, alkaryl, cycloalkyl, etc.;
m is an integer having a value of at least 3; and
Z is a substituent of the class consisting of hydrogen and epoxyalkyl groups, at least one Z per polymer molecule being an epoxyalkyl group and said epoxyalkyl groups having the formula

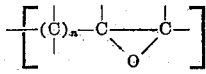

wherein n is an integer having a value advantageously no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

The epoxyalkoxy aryl resins suitable for the practice of this invention can be prepared, in accordance with more complete disclosures given in the above-mentioned copending applications by the reaction of a thermoplastic phenolic-aldehyde resin of a phenol having the formula

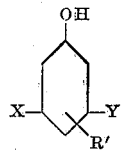

(wherein X, Y and R' are as described above) with a halo-epoxy alkane of the formula

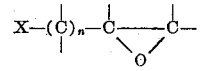

where X is a halogen atom, such as chlorine, bromine, etc.; n is an integer having a value advantageously no greater than 8; and the unoccupied valences of the formula are satisfied by hydrogen or alkyl groups of not more than 7 carbon atoms, the number of carbon atoms in any epoxyalkyl group totaling no more than 10 carbon atoms.

When one phenolic hydroxy group per phenolic unit of the thermoplastic phenolic-aldehyde resin is replaced by an epoxyalkoxy group, the molecular structure of the resultant resin product is believed to be represented at least in part by recurring units having the formula

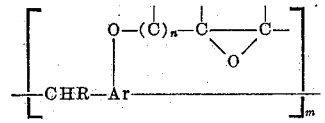

where
Ar represents the aromatic group derived from the phenolic starting compound;
R is hydrogen or an alkyl, alkenyl, aryl, aralkyl, alkaryl, cycloalkyl or furyl group;
n is an integer having a value advantageously no greater than 8; and
m is an integer having a value of at least 3.

Copending patent application Serial No. 164,843 discloses and claims the epoxyalkoxy aryl resins prepared from hydrocarbon-substituted phenols, such as p-cresol, etc., having two available positions ortho or para to a phenolic hydroxy group for aldehyde condensation. Copending patent application Serial No. 164,840 covers such resins from chlorine-substituted phenols, such as p-chlorophenol, m-chloro-p-cresol, etc., having two available ortho-para positions for aldehyde substitution. Copending patent application Serial No. 164,842 covers such resins from phenols having three available ortho-para positions, such as phenol, m-cresol, etc. for aldehyde substitution in which the condensation is controlled by aldehyde concentration to give thermoplastic, fusible resins.

The term "reactive hydrogen" is used herein to mean hydrogen replaceable by sodium or reactive with a Grignard reagent. Illustrative of fiber-forming resinous compositions containing reactive hydrogen are cellulose and cellulose derivatives. It is contemplated that reactive hydrogen is present in the cellulosic polymers either as cellulosic reactive hydrogen found in the unsubstituted or partially substituted cellulose derivatives, such as cellulose, nitrocellulose, regenerated cellulose, cellulose ethers and cellulose esters, including mixed esters and ethers, or as non-cellulosic reactive hydrogen present in partially or completely substituted cellulose in which derivatives reactive hydrogen resides in substituent groups of the following types: OH, COOH, —NH₂, —NH—, —CONH₂, —CONHR,

—SH, —SO₂NH₂, —SO₂NH—, etc. In partially substituted derivatives of the latter class, both cellulosic and non-cellulosic reactive hydrogen will be present. Typical cellulose derivatives which can be used include partially substituted cellulose acetate, cellulose formate, cellulose propionate, cellulose butyrate, cellulose acetate-butyrate, methyl cellulose, ethyl cellulose, benzyl cellulose, etc., and beta-hydroxy-ethyl cellulose, cellulose half esters of maleic acid, succinic acid, fumaric acid, etc.

Other resinous materials containing reactive hydrogen which can be reacted with the epoxyalkyl ether resins according to this invention and which advantageously are capable of forming shaped articles, such as fibers, films, etc., include polyamides, polyvinyl alcohol, polyvinyl acetals, partially hydrolyzed polyvinyl acetate, polymers and copolymers of acrylic acid, maleic acid, fumaric acid, maleic and fumaric half esters, acrylamide, hydroxy-styrenes, amino-styrenes, carboxy-styrenes, copolymers of various vinyl and vinylidene compounds, such as acrylonitrile, styrene, acrylates, methacrylates, vinyl esters, etc., with various unsaturated carboxylic acids, advantageously those having no more than 6 carbon atoms such as acrylic acid, maleic acid, itaconic acid, monomethyl maleate, etc.; phenol-aldehyde resins, resorcinol-aldehyde resins, melamine resins, urea-formaldehyde resins, alkyd resins, such as glycerine-phthalate resins, ethylene glycol-maleate resins, etc., drying oil- and non-drying oil-modified alkyd and phenol-aldehyde resins, etc.

Hydrocarbon-substituted phenols having two available positions ortho or para to a phenolic hydroxy group for aldehyde condensation to give fusible resins suitable for the preparation of the epoxyalkoxy aryl resins include o- and p-cresols, o- and p-ethyl phenols, o- and p-isopropyl phenols, o- and p-tert-butyl phenols, o- and p-sec-butyl phenols, o- and p-amyl phenols, o- and p-octyl phenols, o- and p-nonyl phenols, etc., 2,5-xylenol, 3,4-xylenol, 2,5-diethyl phenol, 3,4-diethyl xylenol, 2,5-diisopropyl phenol, 4-methyl resorcinol, 4-ethyl resorcinol, 4-isopropyl resorcinol, 4-tert-butyl resorcinol, etc., o- and p-benzyl phenol, o- and p-phenethyl phenols, o- and p-phenyl phenols, o- and p-tolyl phenols, o- and p-xylyl phenols, o- and p-cyclohexyl phenols, o- and p-cyclopentyl phenols, etc., 4-phenethyl resorcinol, 4-tolylresorcinol, 4-cyclohexyl resorcinol, etc.

Various chloro-substituted phenols which can also be used in the preparation of phenol-aldehyde resins suitable for the preparation of the epoxyalkoxy aryl resins include o- and p-chlorophenols, 2,5-dichloro-phenol, 2,3-dichloro-phenol, 3,4-dichloro-phenol, 2-chloro-3-methyl-phenol, 2-chloro-5-methyl-phenol, 3-chloro-2-methyl-phenol, 5-chloro-2-methyl-phenol, 3-chloro-4-methyl-phenol, 4-chloro-3-methyl-phenol, 4-chloro-3-ethyl-phenol, 4-chloro-3-isopropyl-phenol, 3-chloro-4-phenyl-phenol, 3-chloro-4-chloro-phenyl-phenol, 3,5-dichloro-4-methyl-phenol, 3,5-dichloro-5-methyl-phenol, 3,5-dichloro-2-methyl-phenol, 2,3-dichloro-5-methyl-phenol, 2,5-dichloro-3-methyl-phenol, 3-chloro-4,5-dimethyl-phenol, 4-chloro-3,5-dimethyl-phenol, 2-chloro-3,5-dimethyl-phenol, 5-chloro-2,3-dimethyl-phenol, 5-chloro-3,4-dimethyl-phenol, 2,3,5-trichloro-phenol, 3,4,5-trichloro-phenol, 4-chloro-resorcinol, 4,5-dichloro-resorcinol, 4-chloro-5-methyl-resorcinol, 5-chloro-4-methyl-resorcinol, etc.

Typical phenols which have more than two positions ortho or para to a phenolic hydroxy group available for aldehyde condensation and which, by controlled aldehyde condensation, can also be used to give fusible resins suitable for the preparation of epoxyalkoxy aryl resins which in turn are satisfactory for use in the present invention are: phenol, m-cresol, 3,5-xylenol, m-ethyl and m-isopropyl phenols, m,m'-diethyl and diisopropyl phenols, m-butyl-phenols, m-amyl phenols, m-octyl phenols, m-nonyl phenols, resorcinol, 5-methyl resorcinol, 5-ethyl resorcinol, etc.

As condensing agents any aldehyde may be used which will condense with the particular phenol being used, including formaldehyde, acetaldehyde, propionaldehyde, butyraldehyde, heptaldehyde, cyclohexanone, methyl cyclohexanone, cyclopentanone, benzaldehyde, and nuclear alkyl-substituted benzaldehydes, such as toluic aldehyde, etc., naphthaldehyde, etc., furfuraldehyde, glyoxal, acrolein, etc., or compounds capable of engendering aldehydes such as paraformaldehyde, hexamethylene tetramine, etc. The aldehydes can also be used in the form of a solution, such as the commercially available formalin. More detailed descriptions of preparation conditions and possible modifications are given in the above-mentioned copending patent applications.

While glycidyl ethers, such as derived from epichlorohydrin, are particularly preferred in the practice of this invention, the epoxyalkoxy aryl resins containing epoxyalkoxy groups of a greater number of carbon atoms are also suitable. These are prepared by substituting for epichlorohydrin such representative corresponding chlorides or bromides of monohydroxy epoxyalkanes as 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2 - epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane. Although it is possible to use haloepoxyalkanes having a greater number of carbon atoms than indicated above, there is generally no advantage in using those having a total of more than 10 carbon atoms.

The number of glycidyl or other epoxyalkyl groups to be added depends on the properties desired in the final product. Generally, the greater the number of epoxy groups present in the polymer, the greater is the effectiveness of the polymer when used as a cross-linking agent in the practice of this invention. However, satisfactory cross-linking properties are usually attained when much less than complete substitution of epoxyalkoxy groups for hydroxy groups is effected. Again the results of various degrees of substitution will vary according to the structure and the molecular weight of the particular fusible phenolic-aldehyde being used. It is often desirable, however, to have at least about 30 percent substitution although even lower amounts may sometimes be satisfactory and higher amounts sometimes preferred. The extent of substitution is controlled by the quantity of haloepoxyalkane that is reacted with the preferred phenolic-aldehyde resin. The remaining phenolic hydroxyl groups can be converted, if desired, into ether or ester groups by obvious reactions.

The thermoplastic epoxyalkoxy aryl resins may be incorporated into the reactive hydrogen-containing composition by any convenient means. For example, they can be introduced into spinning compositions of the reactive hydrogen-containing resin, such as cellulose acetate, cellulose etheracetate, partially or completely saponified polyvinyl acetate, or an acrylonitrile copolymer such as an acrylonitrile-acrylic acid copolymer, etc. The resultant compositions can then be spun into fibers, films, bristles, etc. which can be treated either simultaneously with spinning or cold-drawing or subsequent to these operations, by heat, catalysts, etc., to cause the epoxyalkoxy aryl resin to react with the reactive hydrogen of the cellulose acetate, or of the acrylic acid in the acrylonitrile-acrylic acid copolymer, etc., thereby improving the heat- and solvent-resistance and imparting other improved properties to the fibers and other shaped articles. With such compositions of the present invention, it is possible, after cold-drawing certain fibers and thereby orienting their polymer molecules, to set the polymer molecules of the fiber in a substantially permanently oriented state which will give improved fiber properties such as increased tensile strength and elastic recovery. Cold-drawing may be defined as the stretching of a polymeric material at a temperature below the melting point of the material to give a molecularly oriented structure.

In addition, the epoxyalkoxy aryl resins can be introduced into reactive hydrogen-containing resins by impregnation. For example, polyamide and viscose rayon fibers or other shaped articles can be impregnated by a solution of an epoxyalkoxy aryl resin and thereafter treated by heat, catalysts, etc., to evaporate the solvent and to cause the epoxyalkoxy aryl resin to react with the reactive hydrogen of the polyamide, viscose rayon, etc. If convenient, the impregnated articles may be cold-drawn either before or after interaction of the two resins in order to effect orientation of the polymer molecules.

The single figure of the drawing shows schematically the preparation of the epoxyalkoxyphenolaldehyde resin and the combination of it with the reactive-hydrogen-containing fiber-forming polymeric material.

The following examples illustrate procedures by which compositions of the present invention may be prepared although it is not intended that the invention be limited to the procedures described. In these examples "parts" and "percent" are parts by weight and percent by weight.

Example I

Two copolymers of acrylonitrile and itaconic acid containing 1 and 5 percent itaconic acid respectively are prepared by the following emulsion polymerization procedure. One hundred parts of monomer mixture is, in each case, slowly added over a period of less than an hour to 750–1000 parts of distilled water at 30–50° C. containing dissolved therein 0.6 to 1 part of ammonium persulfate, 0.6 to 1.5 parts of sodium bisulfite, and 0.5 part of sodium dodecyl benzene sulfonate. The polymerization is continued for 1–3 hours, at which time a yield of about 90 percent solid copolymer is precipitated. The resulting copolymers have molecular weights over 10,000 and acid numbers approximately theoretical.

In each case the copolymer is dissolved in N,N-dimethyl formamide and 2 percent (based on the weight of copolymer) of a glycidyl ether derivative of a formaldehyde-p-cresol condensation product, in which the "$m$" of the formula has an average value of about 5 and the resin contains an average of about 2.5 glycidyl groups per polymer molecule, is added to the solution. Fibers are spun from these solutions either by dry spinning or by wet spinning into water baths. The fibers are substantially freed from solvent, dried, then cold-drawn 600–800 percent at 130–145° C. and subsequently heat-treated at 150° C. for one hour to effect cross-linking and to give the fibers good strength and heat-resistant characteristics.

Example II

A cellulose acetate containing approximately 55 percent of combined acetic acid is dissolved in acetone and 3 percent (based on the weight of cellulose acetate) of the glycidyl ether resin used in Example I is added to the solution. Fibers are spun from this solution by dry spinning and, after substantially complete removal of the solvent from the fibers, the fibers are heat treated at about 75° C. for about two hours to effect crosslinking and to give fibers of good strength characteristics.

Satisfactory amounts of epoxyalkoxy aryl resin will vary, of course, with the properties of the particular resin, e. g., with the number of epoxy groups present therein, etc. However, the effects of the epoxyalkoxy aryl resin may be noticeable with as little as 0.1% by weight of epoxyalkoxy aryl resin based on weight of fiber-forming polymeric material although more beneficial effects are obtained with at least 1% by weight. Generally amounts over 5% have no especial value when the polymeric product is to be converted to fibers but when other shaped articles such as moldings are to be made, the mixture may contain as much as 50% epoxyalkoxy aryl resin.

The reaction of the epoxyalkoxy aryl resins with the reactive hydrogen-containing resins may be promoted by heat alone where the reactive hydrogen-containing resin is sufficiently active but various catalysts can be used advantageously to promote the reaction. Very efficient catalysts are dibasic carboxylic acids and their anhydrides such as oxalic, maleic, phthalic, etc., and amines, especially secondary aliphatic amines, such as diethyl amine, dibutyl amine, diethylene triamine, piperidine and derivatives of these amines such as piperidine benzoate. Also very satisfactory are trimethyl amine, triethyl amine, triethanol amine, methyl di-n-propyl amine, guanidine, guanadine derivatives, etc. While other catalysts, such as Friedel-Crafts catalysts and inorganic basic catalysts will promote this reaction, they are generally not as convenient for use in the present application as are the organic acids, acid anhydrides and amines. However, such inorganic catalysts which are effective include aluminum chloride, aluminum bromide, zinc chloride, zinc bromide, boron trifluoride, silicon tetrachloride, stannic chloride, stannic bromide, titanium tetrachloride, bismuth trichloride and the like, as well as inorganic basic catalysts such as alkali hydroxides, calcium oxide, sodium amide, etc. About 1% to 10% of a catalyst based on the weight of epoxyalkoxy aryl resin is generally a suitable quantity to effect the desired reaction. The catalysts may be added with the epoxyalkoxy aryl resin or may be applied, advantageously in the form of a solution, subsequent to the addition of the epoxyalkoxy aryl resin. The reaction is favored by temperatures of 0° to 60° C. and sometimes up to or over 100° C.

Solvents may be used to improve the fluidity of these epoxyalkoxy aryl resins before mixture with the fiber-forming polymeric materials. Volatile solvents generally suitable for thinning these resin compositions include active solvents such as ketones, e. g., acetone, methyl ethyl ketone, etc., esters, e. g., methyl, ethyl, n-butyl acetate, etc., cyclic oxides, e. g., propylene oxide, dioxane, etc., chlorinated compounds, such as chloroform, ethylene dichloride, dichloro-ethyl ether, etc., beta-hydroxy-ethyl acetate, beta-butoxy ethanol, and in some cases 50-50 mixtures of toluene and alcohols such as ethanol.

The viscosity of the resin compositions of this invention may also be controlled by using mixtures of the epoxyalkoxy aryl resins having different molecular weights, for example, by using a mixture of 5 parts of such a resin wherein the "$m$" of the first formula given above has a value of 3, with 1 part of such a resin wherein $m$ has a value of 10. Moreover, the viscosity of any of these resins may be controlled by dissolving the resin in a monomeric epoxyalkane derivative reactive with the resin, such as an aryl glycidyl ether of the formula

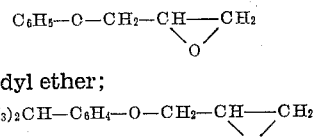

wherein Ar represents an aromatic group; and the remainder of the formula is as previously defined herein for Z of the first formula; for example

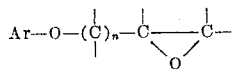

phenyl glycidyl ether;

$(CH_3)_2CH$—$C_6H_4$—$O$—$CH_2$—$CH$——$CH_2$
\ /
O isopropyl-phenyl glycidyl ether, ortho- and para-monobutyl-meta-cresyl glycidyl ethers; etc.; and also other monomeric reactive epoxyalkane derivatives such as glycidyl acetate; mono- and diglycidyl phthalates; etc.

The invention as hereinbefore set forth is embodied in particular form and manner but may be variously embodied within the scope of the claims hereinafter made.

The invention claimed is:

1. A composition of matter suitable for forming shaped articles comprising the reaction product of an active hydrogen-containing fiber-forming polymer derived from the addition polymerization of an ethylenically unsaturated monomer and an epoxyalkoxy aryl resin which is represented at least in part by the formula

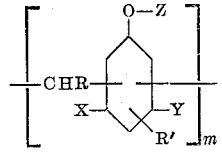

wherein R is a substituent of the class consisting of hydrogen and alkyl, alkenyl, aryl, aralkyl, alkaryl, cycloalkyl and furyl groups; X and Y are substituents selected from the class consisting of hydrogen, chlorine, and alkyl and hydroxy groups; R' is a substituent of the class consisting of hydrogen, chlorine and alkyl, aryl, aralkyl, alkaryl and cycloalkyl groups; $m$ is in integer having a value of at least 3; and Z is a substituent of the class consisting of hydrogen and epoxyalkyl groups, at least one Z per polymer molecule being an epoxyalkyl group and said epoxyalkyl groups having the formula

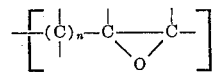

wherein $n$ is an integer having a value no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

2. A composition of matter of claim 1, in which the resin containing reactive hydrogen is an acrylonitrile copolymer.

3. A composition of matter of claim 2, in which the resin containing reactive hydrogen is an acrylonitrile copolymer of a copolymerizable monomer of the class consisting of ethylenically unsaturated carboxylic acids having not more than six carbon atoms and ester derivatives thereof having at least one free carboxylic acid group.

4. A composition of matter of claim 3, in which the resin containing reactive hydrogen is an acrylonitrile-acrylic acid copolymer.

5. A composition of matter of claim 3, in which the resin containing reactive hydrogen is an acrylonitrile-itaconic acid copolymer.

6. A shaped article comprising the composition of claim 1, in which the aryl resin is derived from epichlorhydrin.

7. A shaped article of claim 6, in which the aldehyde condensation product is a formaldehyde condensation product.

8. A shaped article comprising the composition of claim 1, in which the aryl resin is derived from an alkyl phenol from the class consisting of ortho and paraalkyl phenols.

9. A shaped article of claim 8, in which the aldehyde-phenol resin is a formaldehyde-alkyl phenol resin.

10. A fiber comprising the composition of claim 1, in which the resin is derived from epichlorhydrin.

11. A molecularly oriented fiber of claim 10.

12. A molecularly oriented fiber comprising the composition of claim 1, in which the aryl resin is prepared from a formaldehyde-o-cresol resin and epichlorohydrin.

13. A molecularly oriented fiber comprising the composition of claim 1, in which the aryl resin is prepared from a furfuraldehyde-phenol fusible resin and epichlorohydrin.

14. A molecularly oriented fiber comprising the composition of claim 1, in which the aryl resin is prepared from a formaldehyde-o-isopropyl phenol resin and epichlorohydrin.

15. A molecularly oriented fiber comprising the composition of claim 1, in which the aryl resin is prepared from epichlorohydrin and a formaldehyde condensation product of an alkyl phenol from the class consisting of ortho and para-alkyl phenols, and the resin containing reactive hydrogen is an acrylonitrile-acrylic acid copolymer.

References Cited in the file of this patent

UNITED STATES PATENTS

| Number | Name | Date |
|---|---|---|
| 2,040,212 | Orthner et al. | May 12, 1936 |
| 2,142,007 | Schlack | Dec. 27, 1938 |
| 2,506,486 | Bender et al. | May 2, 1950 |
| 2,615,007 | Greenlee | Oct. 21, 1952 |
| 2,615,008 | Greenlee | Oct. 21, 1952 |

FOREIGN PATENTS

| Number | Country | Date |
|---|---|---|
| 576,177 | Germany | May 8, 1933 |
| 630,663 | Great Britain | Oct. 18, 1949 |

OTHER REFERENCES

Carswell, "Phenoplasts," p. 29–34, published 1937 by Interscience Pub., N. Y.